United States Patent [19]

Koch

[11] 4,007,188
[45] Feb. 8, 1977

[54] COUMARIN AND COUMARINIMIDE DERIVATIVES

[75] Inventor: Werner Koch, Oberwil, Switzerland

[73] Assignee: Sandoz Ltd., Basel, Switzerland

[22] Filed: Nov. 25, 1974

[21] Appl. No.: 526,956

Related U.S. Application Data

[63] Continuation-in-part of Ser. No. 332,431, Feb. 14, 1973, abandoned.

[30] Foreign Application Priority Data

Jan. 2, 1973  Switzerland .......................... 51/73

[52] U.S. Cl. ..................... 260/256.4 Q; 260/244 R; 260/256.5 R; 260/343.5; 260/345.2; 260/515 P; 260/501 R; 260/574; 8/1 D
[51] Int. Cl.² ...................................... C07D 405/04
[58] Field of Search .............. 260/256.4 Q, 256.5 R

[56] References Cited

UNITED STATES PATENTS 3,704,302   11/1972   Enomoto et al. ........... 260/256.4 Q

OTHER PUBLICATIONS

Gore et al., "Chemistry of Natural and Synthetic Colouring Matters," 1962, pp. 520, 592–593.
Brown, "The Pyrimidines," 1962, pp. 32–33, 62–63, 82–83, Interscience Publishers.
Brown, "The Pyrimldines, Supplement I," 1970, pp. 44–45, Interscience Publishers.

*Primary Examiner*—Donald G. Daus
*Assistant Examiner*—David E. Wheeler
*Attorney, Agent, or Firm*—Gerald D. Sharkin; Richard E. Vila; Joseph J. Borovian

[57] ABSTRACT

Disclosed are disperse dyes of formula I,

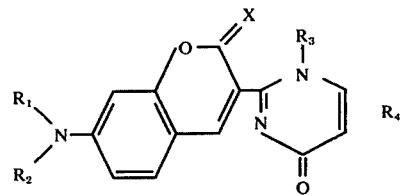

in which X signifies O or NH,
either $R_1$ and $R_2$ each signify an alkyl or phenyl radical,
or $R_1$ is as defined above, and $R_2$ is hydrogen,
or $R_1$ and $R_2$, together with the nitrogen atom, signify a heterocyclic ring
$R_3$ signifies acyl, alkyl, phenyl or a heterocyclic, and
$R_4$ signifies a chain forming a carbocyclic or heterocyclic ring of aromatic character.

8 Claims, No Drawings

COUMARIN AND COUMARINIMIDE DERIVATIVES

This application is a continuation-in-part of copending application Ser. No. 332,431 filed Feb. 14th, 1973, now abandoned.

COUMARIN AND COUMARINIMIDE DERIVATIVES

The invention relates to coumarin and coumarinimide derivatives, free from carboxylic and sulphonic acid groups.

The invention provides compounds of formula I,

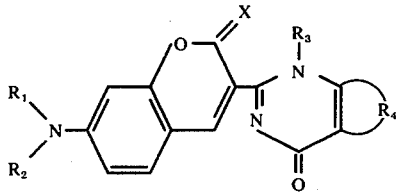

in which X signifies O or NH,
either $R_1$ or $R_2$, which may be the same or different, each signify a substituted or unsubstituted alkyl or phenyl radical, which alkyl radical is of 1 to 6 carbon atoms,
or $R_1$ is as defined above, and $R_2$ is hydrogen,
or $R_1$ and $R_2$, together with the nitrogen atom to which they are attached, signify a substituted or unsubstituted heterocyclic ring of 5 or 6 ring atoms,
$R_3$ signifies a hydrogen atom, an acyl radical or an unsubstituted or substituted alkyl, phenyl or heterocyclic radical, which alkyl radical contains up to 6 carbon atoms, and
$R_4$ signifies a substituted or unsubstituted chain forming a carbocyclic or heterocyclic ring of aromatic character,
which compounds are free from sulphonic or carboxylic acid groups.

The invention also provides a process for the production of compounds of formula I, stated above, characterised by reacting a compound of formula II,

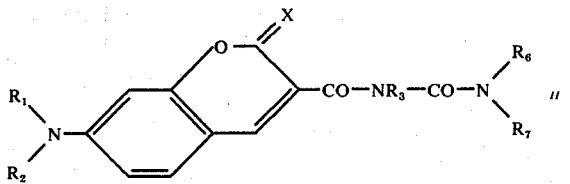

in which $R_1$, $R_2$, $R_3$ and X are as defined above, and
either $R_6$ and $R_7$, which may be the same or different, each signifies a hydrogen atom, or a substituted or unsubstituted alkyl or phenyl radical, which alkyl radical is of 1 to 6 carbon atoms,
or $R_6$ and $R_7$, together with the nitrogen atom to which they are attached, signify a substituted or unsubstituted, saturated, partially saturated or unsaturated five or six membered heterocyclic ring, with a dicarboxylic acid of formula III,

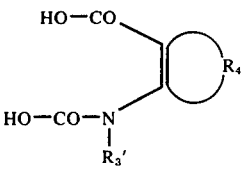

in which $R_4$ is as defined above, and
$R_3'$ has the same significance as $R_3$, defined above, or with the anhydride of the acid formula III, stated above.

The reaction is conveniently carried out at a temperature of from 160° to 250° C. The reaction may be carried out in a solvent or mixed solvent medium or, without solvent, in the melt. Suitable solvents include aromatic solvents such as trichlorobenzene, dichlorobenzene, nitrobenzene, pseudocumene, phthalic acid methyl, ethyl, propyl and butyl esters and durene. Where the reaction is carried out in the melt, the preferred temperature is from 200° to 220° C.

The resulting compound of formula I may be isolated and purified using conventional techniques.

The compounds of formula II may be obtained by reacting a compound of formula IV,

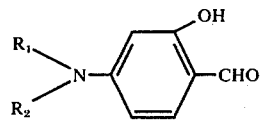

in which $R_1$ and $R_2$ are as defined above, with a compound of formula V,

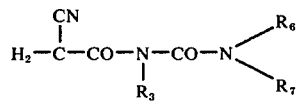

in which $R_3$, $R_6$ and $R_7$ are as defined above, to yield a compound of formula II in which X signifies NH, and, where it is desired to obtain the corresponding compound, in which X signifies O, subjecting such coumarinimide to hydrolysis, cleavage of the imide group-containing ring, and subsequent reclosure of the ring.

The reaction of the 1-hydroxybenzaldehyde with the compound of formula V is conveniently carried out in an inert, preferably anhydrous, solvent, for example in ethanol, methanol or, preferably, in anhydrous dimethyl formamide, dimethyl sulphoxide or dioxane. The reaction is preferably carried out in the presence of an organic base such as piperidine or pyridine. The reaction temperature is conveniently from 30° to 180° C, preferably the boiling point of the solvent and with reflux condensation. The resulting coumarinimide may be isolated in conventional manner, e.g. by evaporation and filtration, in good yield. The hydrolysis, ring cleavage and reclosure of the ring, to obtain the corresponding coumarin derivative, may be carried out, for example, by treatment in a boiling organic acid, e.g. acetic acid, or in boiling dilute mineral acid e.g. 1 to 10% hydrochloric acid. Advantageously, a water-soluble organic solvent, for example methanol or ethanol, is employed with the mineral acid.

$R_6$ and $R_7$, in the compounds of formulae II and V, preferably signify hydrogen atoms.

Any alkyl groups in the compounds of formula I preferably contain 1, 2, 3 or 4 carbon atoms. Preferred substituents for the alkyl groups are halogen, e.g. chlorine or bromine, alkoxy of 1 to 6 carbon atoms, hydroxyl, cyano, thiocyano, vinyl, amino, alkylamino of 1 to 6 carbon atoms, dialkyl amino or N-phenyl-N-alkylamino in which the alkyl moeties are of 1 to 6 carbon atoms, phenyl, phenoxy, acyl, acyloxy or acylamino, in which acyl, acyloxy or acylamino radicals, any alkyl moiety is of 1 to 6 carbon atoms. The most preferred substituted or unsubstituted alkyl groups are methyl or ethyl groups, for production cost reasons.

As substituents of any phenyl groups or of the radical $R_4$ may be given the above substituents on the alkyl radicals and, in addition, alkyl radicals of 1 to 6 carbon atoms and nitro groups. Where any phenyl radical or $R_4$ is substituted, it preferably bears 1 or 2 of the above substituents and, where two substituents are present, such may be the same or different. A preferred significance of $R_4$ is $-CH=CH-CH=CH-$.

Where $R_1$ and $R_2$, together with the nitrogen atom, form a heterocyclic ring system, such may be saturated, unsaturated or of aromatic nature and may bear further hereto atoms, such as oxygen, sulphur or nitrogen.

As will be obvious, the definition of $R_1$ and $R_2$ is not intended to include simultaneous significances which would result in steric hindrance of such magnitude as to make the compounds impossible to produce.

By the term "acyl", as used herein, is meant the residue which results from removal of a hydroxy group from an acid or hypothetical acid and is intended to include radicals of formulae $R-O-CO-$, $R-SO_2-$, $R-O-SO_2-$, $R'-NR'-CO-$, $R'-NR'SO_2-$ and $R'-CO-$ in which R signifies an alkyl radical of 1 to 6, preferably 1 to 4, carbon atoms or a phenyl radical, and $R'$ signifies a hydrogen atom, an alkyl radical of 1 to 6, preferably 1 to 4, carbon atoms or a phenyl radical.

The terms "acyloxy" and "acylamino" are to be understood accordingly.

The preferred compounds of formula I are the compounds of formula Ia,

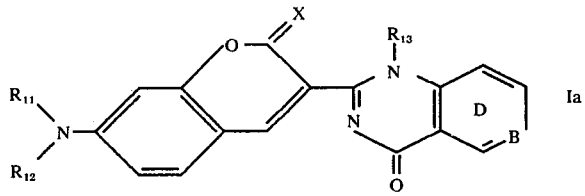

in which X is as defined above, $R_{11}$ signifies an alkyl radical of 1 to 4 carbon atoms, unsubstituted or substituted by alkoxy of 1 to 4 carbon atoms, cyano, formyloxy, alkylcarbonyloxy, of which the alkyl radical is of 1 to 4 carbon atoms, alkoxycarbonyloxy or alkoxycarbonyl, of which the alkoxy radical is of 1 to 4 carbon atoms, allyl or phenyl.

$R_{12}$ signifies a hydrogen atom or has one of the significances, defined above, of $R_{11}$, $R_{13}$ signifies a hydrogen atom, an alkyl group of 1 to 4 carbon atoms, a phenyl radical, an alkylaminoalkyl or alkylaminoalkyl phenyl radical, of which the alkyl moiety is of 1 to 4 carbon atoms, a thionyl radical, a thiazolyl radical, a benzothiazolyl radical, a methoxy benzothiazolyl radical, an alkylcarbonyl radical, of which the alkyl moiety is of 1 to 4 carbon atoms, a benzoyl radical, an alkylsulphonyl radical, of which the alkyl moiety is of 1 to 4 carbon atoms, a phenylsulphonyl radical or a toluylsulphonyl radical, B signifies a nitrogen atom or a methylene group, and ring D is unsubstituted or substituted by 1 or 2 substituents selected from chlorine, bromine, methyl, methoxy, acetyl, benzoyl, methylsulphonyl, phenylsulphonyl, toluylsulphonyl, aminosulphonyl or alkylaminosulphonyl, in which the alkyl moiety is of 1 to 4 carbon atoms.

Still further preferred compounds of formula I are compounds of formula Ia',

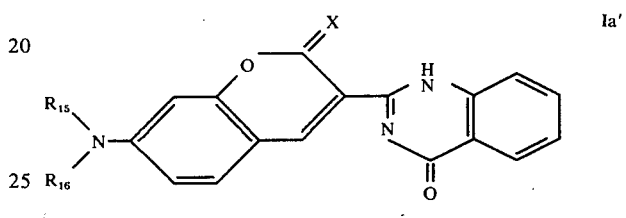

in which X is as defined above, and $R_{15}$ and $R_{16}$, which may be the same or different, each signify an ethyl radical, a cyanoethyl radical, an acetoxyethyl radical, a propionyloxyethyl radical, a methoxycarbonyloxyethyl radical, an ethoxycarbonyloxyethyl radical, a methoxycarbonylethyl radical or an ethoxycarbonylethyl radical.

The compounds of the invention are suitable for use as disperse dyes for dyeing and printing synthetic and semi-synthetic organic fibres of high molecular weight and hydrophobic character. The dyeings obtained have notable light fastness, brilliance of shade and have pronounced greenish fluorescence.

The compounds of the invention may be incorporated in dyeing preparations by known methods, for example by grinding in the presence of dispersing agents and/or fillers, with or without subsequent vacuum or atomizer drying. The compounds may be applied by conventional exhaust dyeing, pad dyeing or printing methods.

From aqueous dispersions, the compounds build up powerfully on textile materials and are particularly suitable for dyeing and printing textiles of polyester, cellulose diacetate, cellulose triacetate and synthetic polyamide fibres using conventional methods, e.g. as described in French Pat. No. 1,445,371. The dyeings obtained show notably good fastness to light, thermofixation, sublimation and pleating. They have notable wet fastness properties, for example to water, sea water, washing, perspiration and solvents, including dry cleaning liquors and to lubricants, rubbing, cross-dyeing, ozone, gas fumes and chlorine. The dyeings are stable to pre-cure and post-cure permanent press finishing processes, to soil release finishes and to varying pH conditions. They reserve wool and cotton and are stable to reducing action in the dyeings of textiles containing wool.

The following Examples, in which all parts and percentages are by weight, illustrate the invention.

EXAMPLE 1

15 Parts of 3-ureido-7-diethylaminocoumarin of formula

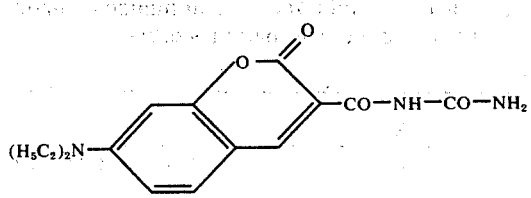

and 9 parts of isatic anhydride are intimately ground in a crucible under a nitrogen atmosphere and gradually heated to about 210°. With powerful evolution of carbon dioxide and ammonia, a melt forms which is held at 200° to 220° under a continuous current of nitrogen gas for 2 hours. Evolution of the gases, however, practically ceases after one hour. On cooling, the reaction product is pulverized. It is converted by the normal treatments into prepared forms for application to textiles. The colour yield on polyester fibres is very good and the yellow dyeings, which show marked greenish fluorescence, have excellent fastness properties.

A chromatographically purified sample of the dye thus obtained, having the formula,

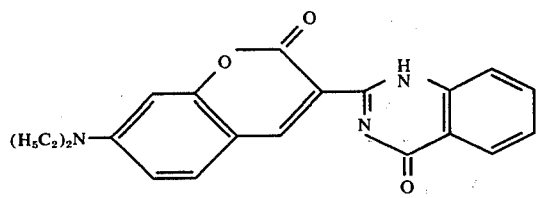

has a melting point of 262°. Elementary analysis and spectrum analysis give the empirical formula $C_{21}H_{19}O_3N_3$ and a molecular weight of 361 ($^m/_3 = 361$).

The ultra-violet spectrum of the compound in methanol solution gave the values:

| | | |
|---|---|---|
| $\lambda_1 = 214$ | m$\mu$ | (log$\epsilon$ = 4.65) |
| $\lambda_2 = 291.5$ | m$\mu$ | (log$\epsilon$ = 4.09) |
| $\lambda_{max} = 456$ | m$\mu$ | (log$\epsilon$ = 4.74) |

The 3-ureido-7N-diethylaminocoumarin can be produced as follows. 12.7 Parts of the compound of formula NC—CH$_2$CONHCONH$_3$, produced in accordance with German Pat. No. 175,415, and 19.3 parts of 2-hydroxy-4-N-diethylaminobenzaldehyde are dissolved in 300 parts of absolute ethanol, with the subsequent addition of 2 parts of piperidine. The solution is boiled for a short time with reflux. The condensation product forms very rapidly and settles out in the form of yellow acicular crystals. It is filtered cold, washed with a little ethanol and dried. 28 Parts of the compound thus formed are dissolved in 400 parts of aqueous-alcoholic hydrochloric acid (200 parts of 2% hydrochloric acid and 200 parts of ethanol) and boiled for about 1 hour with reflux. The reaction product of formula

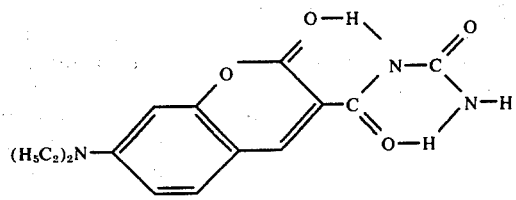

which is yellow and has a greenish fluorescence shade, begins to settle out during boiling and after the reaction mixture has cooled it is isolated by filtration.

EXAMPLE IB 7.5 Parts of 3-ureido-7-N-diethylaminocoumarin and 8 parts of isatic anhydride are dissolved with heating in 200 parts of trichlorobenzene with the addition of 0.1 part of boric acid. The solution is held at the boiling temperature for 3 hours with reflux. Immediately afterwards it is cooled and the precipitated product filtered, washed with 100 parts of ethanol and then with 500 parts of petroleum ether and dried. The dye thus formed is identical with the dye obtained in Example 1.

EXAMPLE 2

15.1 Parts of ureido-7-N-diethylamino-2-imidocoumarin of formula

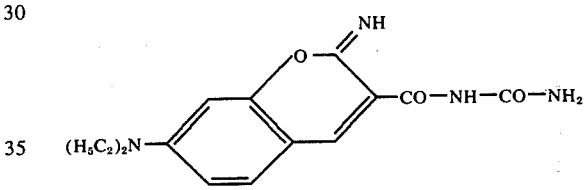

and 6.5 parts of isatic anhydride are dissolved in 250 parts of trichlorobenzene (mixture of isomers) under a nitrogen atmosphere and boiled for 3 hours with reflux. A further 2.5 parts of isatic anhydride are gradually added in 3 hours at boiling temperature, then the reaction mixture is treated under the same conditions for a further 3 hours. After cooling the insoluble product is filtered off, washed with trichlorobenzene and then with methanol and dried. The dye formed is of formula

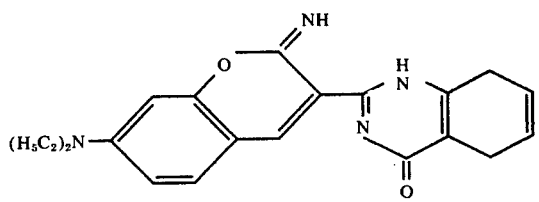

and in the dyeing properties is closely comparable to the dye obtained in Example 1.

The ureido-7-N-diethylamino-2-imidocoumarin can be produced as follows. 12.7 Parts of the compound of formula NC—CH$_2$CONHCONH$_2$, produced in accordance with German Pat. No. 175,415, and 19.3 parts of 2-hydroxy-4-N-diethylaminobenzaldehyde are dissolved in 300 parts of absolute ethanol and after the addition of 2 parts of piperidine the solution is boiled for a short time. The condensation product forms very rapidly and settles out in the form of yellow needle-shaped crystals. It is filtered cold, washed with some ethanol and dried.

Following the procedure of Examples 1 and 2, but employing compounds of formula II and III in which $R_1$, $R_2$, $R_3$ and $R_4$ have the significance shown in the following table 1, corresponding compounds of the invention are obtained.

Each Example is representative of the production of two dyes, the coumarin and coumarinimide derivatives. All the dyes dye hydrophobic fibres in greenish yellow shades. The coumarin and coumarinimide compounds are virtually identical in their properties.

Table 1

| Exp. No. | $R_1$ | $R_2$ | $R_3$ | $R_4$ |
| --- | --- | --- | --- | --- |
| 3 | —CH₂CH₂CN | —CH₂CH₂OCOCH₃ | H | —CH=CH—CH=CH— |
| 4 | —CH₂CH₂OH | —CH₂CH₂CN | H | " |
| 5 | —CH₂CH₂OCHO | —CH₂CH₂OCHO | H | " |
| 6 | —CH₂CH₂COOCH₃ | —CH₃ | H | " |
| 7 | —CH₂CH₂OCOC₂H₅ | —CH₂CH₂OCOC₂H₅ | H | " |
| 8 | —CH₂CH₂OCOOCH₃ | —CH₂CH₂OCOOCH₃ | H | " |
| 9 | —CH₂CH₂OCOOC₂H₅ | —CH₂CH₂OCOOC₂H₅ | H | " |
| 10 | —CH₂CH₂COOC₄H₉ | —CH₂CH₂CH₂CH₃ | H | " |
| 11 | —CH₂CH(CH₃)OCOCH₃ | —CH₂CH(CH₃)OCOCH₃ | H | " |
| 12 | —CH₂CH₂CH₃ | —CH₂CH₂CH₃ | —COC₆H₅ | " |
| 13 | —CH₂CH₂OCOOCH₂CH₂CH₃ | —CH₃ | H | " |
| 14 | —CH₂CH₂CH₂CH₃ | —CH₂CH₂COOCH(CH₃)₂ | H | " |
| 15 | —CH₂CH₂CN | —CH₂CH₂CN | H | " |
| 16 | —C₂H₅ | —C₂H₅ | —COCH₃ | " |
| 17 | —CH₂CH₂OC₂H₅ | —CH₂CH₂OC₂H₅ | —COC₂H₅ | " |
| 18 | —C₂H₅ | —C₂H₅ | —SO₂CH₃ | " |
| 19 | " | " | SO₂C₆H₅ | " |
| 20 | " | " | —SO₂—⟨C₆H₄⟩—CH₃ | " |
| 21 | " | " | —CH₃ | " |
| 22 | " | " | —C₂H₅ | " |
| 23 | " | " | thiazolyl group | " |
| 24 | " | " | —CH₂CH₂N(CH₃)₂ | " |
| 25 | " | " | ⟨C₆H₄⟩—CH₂N(CH₃)₂ | " |
| 26 | " | " | benzothiazolyl group | " |
| 27 | " | " | benzothiazolyl-C group | " |
| 28 | " | " | thiazolyl group | " |
| 29 | " | —C₆H₅ | H | " |

Table 1-continued

| Exp. No. | R₁ | R₂ | R₃ | R₄ |
|---|---|---|---|---|
| 30 | " | —C₂H₅ | —C₆H₅ | " |
| 31 | —CH₂CH₂OCOC₆H₅ | " | H | " |
| 32 | —CH₂—CH=CH₂ | " | H | " |
| 33 | —CH₂CH₂CN | H | H | " |
| 34 | —CH₂CH₂OCOCH₃ | H | H | " |

Again, following the procedures of Examples 1 and 2, the following table 2 gives the significances of $R_1$ and $R_2$ in the compounds of formula II, and the significance of B and $R_5$ in the compounds of formula III''',

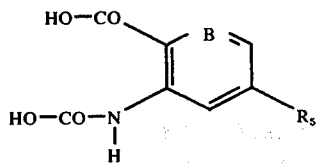

used as compounds of formula III. Again, each Example is representative of two dyes, the coumarin and coumarinimide derivatives, virtually identical in their properties and all dyeing hydrophobic fibres in greenish yellow shades.

Table 2

| Exp. No. | R₁ | R₂ | R₅ | B |
|---|---|---|---|---|
| 35 | —C₂H₅ | —C₂H₅ | —SO₂NH₂ | —CH= |
| 36 | " | " | —SO₂N(CH₃)₂ | " |
| 37 | " | " | —SO₂NHCH₃ | " |
| 38 | " | " | —SO₂NHC₆H₅ | " |
| 39 | —CH₂CH₂CN | " | —COC₆H₅ | " |
| 40 | —C₂H₅ | " | —COCH₃ | " |
| 41 | —CH₂CH₂CN | " | —NHCOCH₃ | " |
| 42 | " | —CH₂CH₂OCOCH₃ | Br | " |
| 43 | —C₂H₅ | —C₂H₅ | Cl | " |
| 44 | " | " | —NHCOC₆H₅ | " |
| 45 | " | " | —CH₃ | " |
| 46 | " | " | —OCH₃ | " |
| 47 | " | " | H | —N= |
| 48 | —CH₂CH₂CN | " | " | " |

APPLICATION EXAMPLE

A mixture of 7 parts of the dye produced as described in Example 1, 4 parts of sodium dinaphthyl methane disulphonate, 4 parts of sodium cetyl sulphate and 5 parts of anhydrous sodium sulphate is ground in a ball mill for 48 hours to give a fine powder.

One part of the powder is dispersed in a small amount of water and the dispersion added through a sieve to a bath of 4000 parts of water containing 3 parts of sodium lauryl sulphate. The liquor to goods ratio is 40:1. At 40°–50°, 100 parts of a scoured fabric of polyester fibre are entered into the dyebath. An emulsion of 20 parts of a chlorinated benzene in water is added, then the temperature of the bath is raised slowly to 100° and the fabric dyed for 1 to 2 hours at 95°–100°. On removal it is rinsed, soaped, rinsed again and dried. A level, brilliant greenish yellow dyeing is obtained which has excellent fastness to light, washing, water, sea water, perspiration, cross dyeing, sublimation, gas fumes, thermofixation, pleating and permanent press finishing.

At the time of filing the above identified copending application Ser. No. 332,431, the compounds were described as having the formula

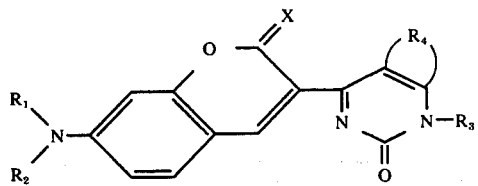

wherein X, $R_1$, $R_2$, $R_3$ and $R_4$ are as defined above.

What is claimed is:

1. A compound of formula Ia,

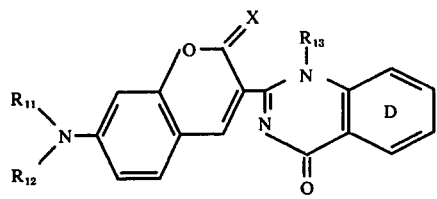

wherein
$X$ is O or NH,
$R_{11}$ is $C_{1-4}$alkyl or monosubstituted $C_{1-4}$alkyl, wherein the substituent of monosubstituted $C_{1-4}$alkyl is $C_{1-4}$alkoxy, cyano, formyloxy, $C_{1-4}$alkylcarbonyloxy, $C_{1-4}$alkoxycarbonyloxy, $C_{1-4}$alkoxycarbonyl, allyl or phenyl,
$R_{12}$ is hydrogen or has one of the significances of $R_{11}$,
$R_{13}$ is hydrogen, $C_{1-4}$alkyl, phenyl, $C_{1-4}$alkylaminoC$_{1-4}$alkyl, $C_{1-4}$alkylaminoC$_{1-4}$alkylphenyl, thionyl, thiazolyl, benzothiazolyl, methoxybenzothiazolyl, $C_{1-4}$alkylcarbonyl, benzoyl, $C_{1-4}$alkylsulphonyl, phenylsulphonyl or toluylsulphonyl, and
ring D is unsubstituted or substituted by 1 or 2 substituents selected from chloro, bromo, methyl, methoxy, acetyl, benzoyl, methylsulphonyl, phenylsulphonyl, toluylsulphonyl, aminosulphonyl and $C_{1-4}$alkylaminosulphonyl.

2. A compound according to claim 1 of formula Ia'

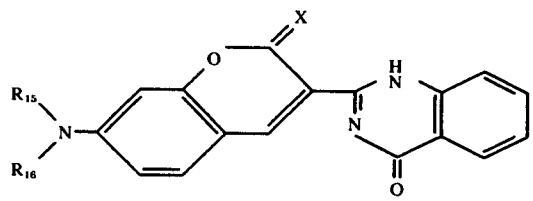

wherein $R_{15}$ and $R_{16}$ each, independently, is ethyl, cyanoethyl, acetoxyethyl, propionyloxyethyl, methoxycarbonyloxyethyl, ethoxycarbonyloxyethyl, methoxycarbonylethyl or ethoxycarbonylethyl, and X is as defined in claim 1.

3. A process for producing a compound of formula Ia, as defined in claim 1, comprising the step of reacting a compound of formula II,

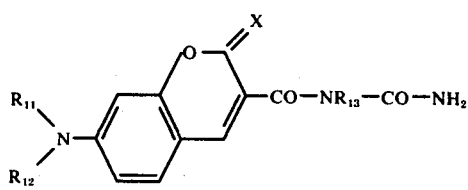

wherein $R_{11}$, $R_{12}$, $R_{13}$ and X are as defined in claim 1, with a dicarboxylic acid of formula III,

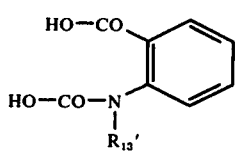

wherein $R_{13}'$ has the same significance as $R_{13}$ defined above, or with the anhydride of the acid of formula III.

4. A compound according to claim 2 of formula

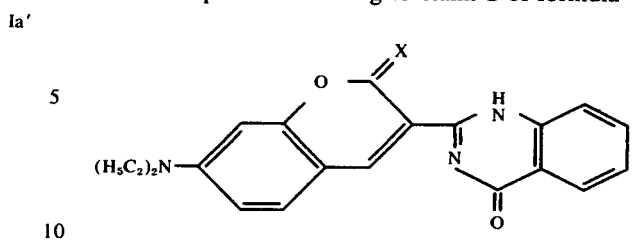

in which X signifies O or NH.

5. A compound according to claim 2 of formula

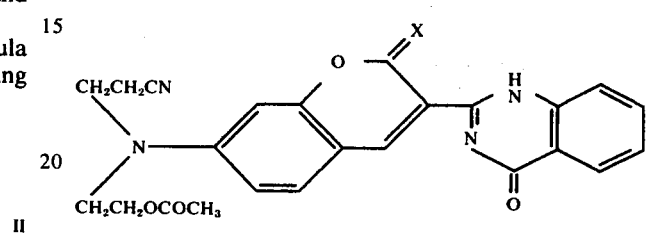

in which X signifies O or NH.

6. A compound according to claim 2 of formula

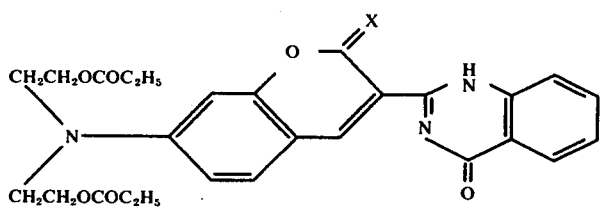

in which X signifies O or NH.

7. A compound according to claim 2, of formula

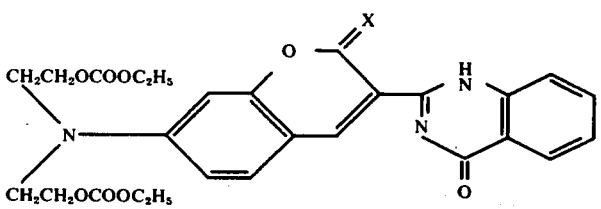

in which X signifies O or NH.

8. A compound according to claim 2, of formula

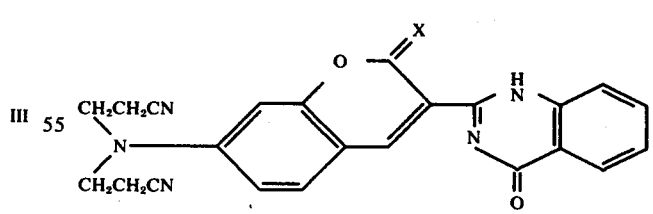

in which X signifies O or NH.

* * * * *